Dec. 9, 1924. 1,519,048
E. R. POWELL
BED
Filed April 13, 1922
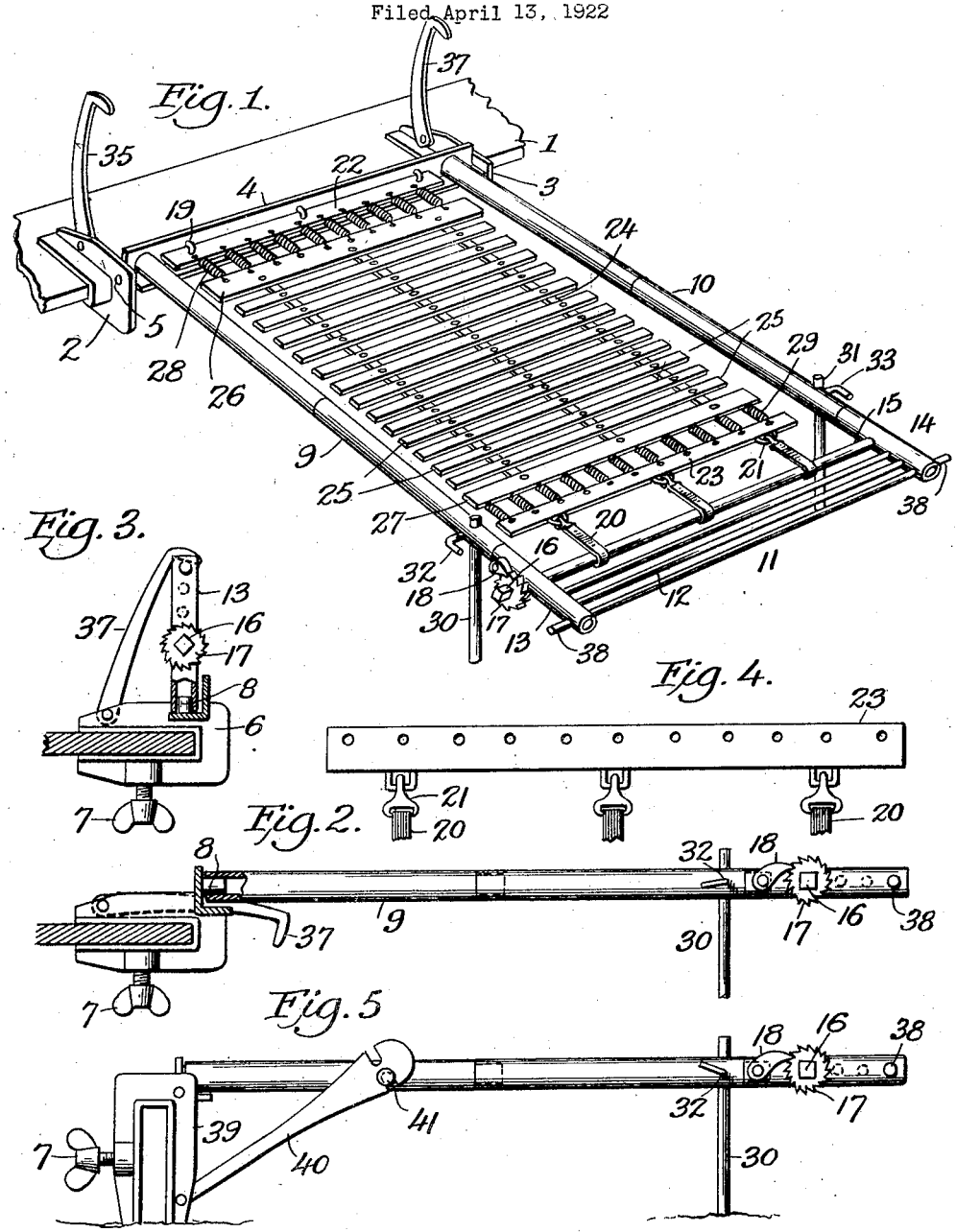
INVENTOR.
Edgar R. Powell,
BY
McCracken + Patch
ATTORNEYS Patented Dec. 9, 1924.

1,519,048

UNITED STATES PATENT OFFICE.

EDGAR R. POWELL, OF PAYETTE, IDAHO.

BED.

Application filed April 13, 1922. Serial No. 552,081.

*To all whom it may concern:*

Be it known that I, EDGAR R. POWELL, a citizen of the United States, residing at Payette, in the county of Payette and State of Idaho, have invented certain new and useful Improvements in Beds, of which the following is a specification.

My invention relates to an improvement in beds, and particularly to a folding or collapsible bed structure for use by automobilists.

An object of my invention is to provide a structure which can be mounted on the running-board of a vehicle and extended for use, or can be entirely detached, and which in either relation presents a full sized and substantial structure.

A further object resides in so constructing the parts that when the bed is not in use the various portions can be disconnected and folded to be collapsed into compact form, to thus be readily packed and carried.

A still further object is to provide portions adapted to be set up on the running-board of the vehicle, when not in use, to form a luggage carrier in which the remaining parts of the bed and other luggage can be packed and carried.

With these and other objects in view, which will be apparent from the drawings, specification and claim, this invention includes certain novel features of construction and combinations of parts which will now be set forth.

In the drawings:—

Figure 1 is a view in perspective of my improved bed showing the parts as they appear when attached upon a running-board and extended for use.

Fig. 2 is a view in side elevation with portions in section.

Fig. 3 is a view in side elevation illustrating the manner in which the parts are set as a luggage carrier.

Fig. 4 illustrates one of the spring-supporting bars, and

Fig. 5 is a view similar to Fig. 2, with a slight modification.

As illustrated in Fig. 1, the bed structure is connected with and extended from the running-board 1 of an automobile, and the clamp members 2 and 3 connect the parts therewith. An angle bar 4 is provided with bearing trunnions 5 at its ends, and is mounted in bearing openings in the webs 6 provided on the clamps 2 and 3. Clamp-screws 7 are provided for the clamps 2 and 3, and the clamp members are thus rigidly mounted on the running board 1, the angle bar 4 being journaled between the clamp members so that it can be turned to reverse the horizontal and vertical disposition of its wings.

Studs 8 are provided on one of the wings of angle-bar 4 adjacent the ends thereof, and side bars 9 and 10, which are of tubular material and preferably jointed, are adapted to be fitted on the studs 8 to extend at right angles from the angle bar.

A foot section, generally indicated at 11, is made up of the cross bars 12 and side bars 13 and 14, which are adapted to fit upon the ends of side bars 9 and 10 and extend in line therewith. A shaft 15 is journaled across between the side members 13 and 14 and at one end is square, as at 16 to receive a crank handle by which the shaft can be turned. A ratchet wheel 17 is provided on the shaft and a dog or pawl 18 on the adjacent side bar engages with the ratchet wheel to hold the shaft against rotation in one direction.

The mounting of the parts as above described provides a substantially rectangular supporting frame structure, and the angle bar 4 has a plurality of hooks 19 arranged between the side bars 9 and 10, while the shaft 15 has the strips 20 connected therewith and terminating in hooks 21. Spreader bars 22 and 23 are provided with openings to receive hooks 19 and loops in which the hooks 21 can be caught, and these spreader bars can thus be connected at opposite ends of the supporting frame structure. The main supporting portion of the bed is made up of the flexible members 24 which have a plurality of slats 25 secured transversely thereacross, and which have bars 26 and 27 secured to their ends. Springs 28 and 29 are connected between the bar 26 and spreader bar 22 at one end, and between bar 27 and spreader bar 23 at the remaining end.

Supporting legs 30 and 31 are passed through openings adjacent the outer ends of the side bars 9 and 10, and are held in adjusted positions by clamping screws 32 and 33, and when the parts are extended, these legs 30 and 31 form the support for the foot end of the bed, the head end being supported from the running-board 1. When the parts have been assembled, a crank can be fitted on the squared end of shaft 15 and this shaft is revolved to wind the strips 20 thereon to secure the proper tension on the springs 28 and 29, and thus give the desired support for the slat or main supporting portion of the bed. When the dog or pawl 18 is released, the slat will again be loose and the parts can be disassembled. Then the foot section 11 can be fitted on the stud 8, and the angle bar 4 can be swung or revolved to dispose this foot section in a vertical relation, as shown in Fig. 3. Hooks 35 and 37 are provided on the clamp members 2 and 3 and engage with the extended ends 38 of one of the cross bars 12 of the foot section, to thus hold this portion in upright relation. The slat portion of the bed and the remaining members can then be rolled up and packed upon the running board with other luggage, to be held in place by the foot section.

In Figure 5 I have shown a slightly different structure in which the clamp 39 at each end of angle bar 4 is made of sufficient size that it can be turned down to form a supporting leg when detached from the running board. The hook mebers 40 are connected with the clamp members and are adapted to engage headed pin 41 to hold the clamps in the desired supporting position. The hooks 40 have notches on the opposite sides to engage with the extended end 38 on the foot section when the structure is fitted as a luggage carrier.

While I have herein described only certain specific embodiments and have mentioned certain modifications, it will be appreciated that in practice I do not wish to limit myself to the exact construction and the specific details as herein set forth, but that I may resort to any practical modification falling within the scope of the invention as defined in the appended claim.

Having thus described my invention what I claim is:

A combined bed and luggage carrier for vehicles comprising, with clamps to be mounted on the running board of a vehicle, an angle bar pivoted for turning movement between said clamps, side bars fitted to extend from the angle bar, a foot section to be mounted at the outer ends of the side bars, adjustable legs associated with the side bars to support the outer ends thereof, a spring structure detachably connected between the angle bars and the foot section, means carried by the foot section to tighten the spring structure, the foot section being adapted to be mounted on the angle bar in an upright relation when the parts are disassembled, and means to hold the foot section in the upright position, said angle bar being shifted to different relative settings for the two mountings of the parts.

In testimony whereof I affix my signature.

EDGAR R. POWELL.